US010049409B1

(12) United States Patent
Laufer et al.

(10) Patent No.: US 10,049,409 B1
(45) Date of Patent: Aug. 14, 2018

(54) LINKING DATA FROM MULTIPLE MARKET PARTICIPANTS TO GENERATE A CONSOLIDATED AUDIT TRAIL

(71) Applicant: JPMorgan Chase Bank, NA, New York, NY (US)

(72) Inventors: Leonard Laufer, Scarsdale, NY (US); James E. Saber, Wilmington, DE (US); Helen Altshuler, Brooklyn, NY (US); Julie Pun, Syosset, NY (US); Rajesh L. Tolani, Marlboro, NJ (US); Shivraj Mundy, West Chester, PA (US); Michael B. Solovay, New York, NY (US); Kamla Hatwar, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 14/321,797

(22) Filed: Jul. 1, 2014

Related U.S. Application Data

(60) Provisional application No. 61/918,455, filed on Dec. 19, 2013.

(51) Int. Cl.
  *G06Q 10/00* (2012.01)
  *G06Q 40/00* (2012.01)
(52) U.S. Cl.
  CPC .................................. *G06Q 40/12* (2013.12)
(58) Field of Classification Search
  CPC ........ G06Q 40/10; G06Q 40/02; G06Q 40/00; G06Q 10/00
  USPC ........................................................... 705/30
  See application file for complete search history.

(56) References Cited

U.S. PATENT DOCUMENTS

| | | | | |
|---|---|---|---|---|
| 6,122,630 | A  * | 9/2000 | Strickler | G06F 17/30575 |
| 6,856,970 | B1 * | 2/2005 | Campbell et al. | 705/35 |
| 7,106,843 | B1 * | 9/2006 | Gainsboro | H04M 3/2281 |
| | | | | 379/191 |
| 7,158,948 | B1 * | 1/2007 | Rodriguez | G06Q 10/087 |
| | | | | 705/22 |
| 2002/0062280 | A1 * | 5/2002 | Zachariassen | G06Q 20/10 |
| | | | | 705/39 |
| 2002/0107794 | A1 * | 8/2002 | Furphy | G06Q 10/0875 |
| | | | | 705/40 |

(Continued)

*Primary Examiner* — Oluseye Iwarere
(74) *Attorney, Agent, or Firm* — LeClairRyan, PLLC

(57) ABSTRACT

Technologies are disclosed for linking data from multiple market participants to generate a consolidated audit trail. In one implementation, a processing device receives, from a first market participant and with respect to a first transaction, first transaction information, the first transaction information including (a) an identity of a beneficiary of the first transaction and (b) one or more first transaction parameters associated with the first transaction, generates an audit trail with respect to the first transaction, the audit trail including the first transaction information, receives, from a second market participant and with respect to the first transaction, second transaction information, the second transaction information including one or more second transaction parameters associated with the first transaction, links the second transaction information with the audit trail, processes the second transaction information and the audit trail to identify a discrepancy; and initiates one or more first actions based on the discrepancy.

19 Claims, 4 Drawing Sheets

(56) References Cited

U.S. PATENT DOCUMENTS

| | | | |
|---|---|---|---|
| 2005/0151995 A1* | 7/2005 | Hauser et al. | 358/1.15 |
| 2005/0171811 A1* | 8/2005 | Campbell et al. | 705/1 |
| 2005/0177389 A1* | 8/2005 | Rakowicz | G06Q 20/3829 705/75 |
| 2005/0177507 A1* | 8/2005 | Bandych | G06Q 20/102 705/40 |
| 2006/0265281 A1* | 11/2006 | Sprovieri | G06Q 30/02 705/14.26 |
| 2007/0094721 A1* | 4/2007 | Nguyen | G06Q 50/34 726/9 |
| 2008/0103972 A1* | 5/2008 | Lanc | G06Q 20/32 705/44 |
| 2008/0222639 A1* | 9/2008 | Stockton et al. | 718/101 |
| 2008/0313076 A1* | 12/2008 | Szewczyk | G06Q 20/10 705/39 |
| 2009/0083079 A1* | 3/2009 | Law et al. | 705/4 |
| 2009/0112747 A1* | 4/2009 | Mullen | G06Q 20/04 705/35 |
| 2009/0182653 A1* | 7/2009 | Zimiles | 705/30 |
| 2009/0242626 A1* | 10/2009 | Jones et al. | 235/379 |
| 2011/0119119 A1* | 5/2011 | Sosikian | 705/14.7 |
| 2011/0225059 A1* | 9/2011 | Mittag | G06Q 20/20 705/21 |
| 2013/0179313 A1* | 7/2013 | Basu | G06Q 40/10 705/30 |

\* cited by examiner

LINKING DATA FROM MULTIPLE MARKET PARTICIPANTS TO GENERATE A CONSOLIDATED AUDIT TRAIL

CROSS-REFERENCE TO RELATED APPLICATION

This application is related to and claims the benefit of U.S. Patent Application No. 61/918,455, filed Dec. 19, 2013, the entirety of which is incorporated herein by reference.

TECHNICAL FIELD

Aspects and implementations of the present disclosure relate to data processing, and more specifically, to linking data from multiple market participants to generate a consolidated audit trail.

BACKGROUND

Multiple financial systems generate and maintain information with respect to the execution and settlement of financial transactions. However, such systems do not enable efficient monitoring of a transaction throughout the various stages of the transaction process.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives, from a first market participant and with respect to a first transaction, first transaction information, the first transaction information including (a) an identity of a beneficiary of the first transaction and (b) one or more first transaction parameters associated with the first transaction, generates an audit trail with respect to the first transaction, the audit trail including the first transaction information, receives, from a second market participant and with respect to the first transaction, second transaction information, the second transaction information including one or more second transaction parameters associated with the first transaction, links the second transaction information with the audit trail, processes the second transaction information and the audit trail to identify a discrepancy; and initiates one or more first actions based on the discrepancy.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
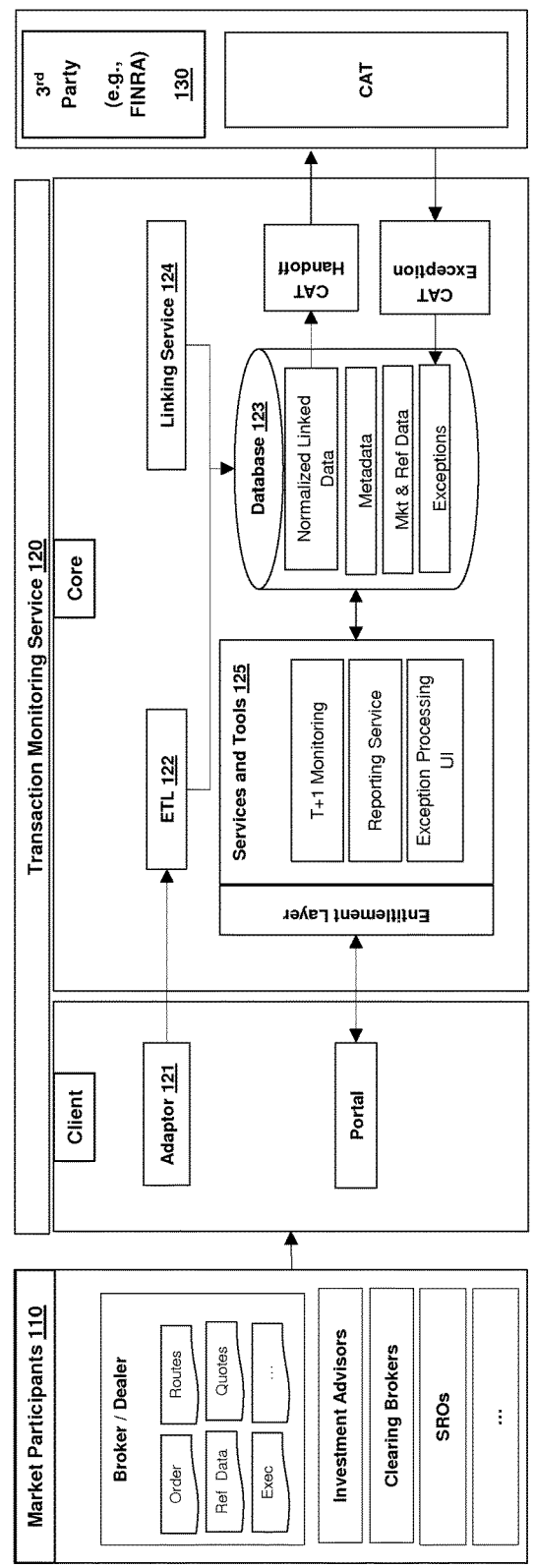
FIG. 1 is a schematic diagram depicting various elements and/or aspects described herein, in accordance with aspects and implementations of the present disclosure.

Aspects and implementations of the present disclosure are directed to linking data from multiple market participants to generate a consolidated audit trail.

Various regulations (e.g., SEC Rule 613) may impose new reporting requirements on various financial market participants (including, without limitation, exchanges, broker dealers, investment managers, individuals, self-regulatory organizations, clearing houses, custodians, etc.), such as with respect to tracking and/or reporting aspects of each trade and the ultimate beneficiary of a particular transaction. These requirements will require this information to be maintained and reported in a prescribed format (e.g., a Consolidated Audit Trail ("CAT") format) from order inception through routing, cancellation, modification, execution and settlement of the transaction.

As described herein, a reporting and analysis platform can be implemented in communication with each of the various parties/systems through which trades or transactions are initiated/processed (e.g., broker/dealer, clearing brokers, etc.). While in certain implementations the transactions themselves can be processed/executed in a conventional manner, one or more additional data fields (e.g., fields that correspond to/reflect the identity of the ultimate beneficiary of the transaction) can be added or linked to the existing record(s) that are generated by the various system(s) to represent aspects of the transaction.

Additionally, as a transaction progresses through various operations and/or systems (e.g., from an initial order through clearing, etc.), transaction information (including the ultimate beneficiary information) can be associated, chained, and/or linked with the transaction from step to step. In doing so, an audit trail can be created and maintained, reflecting the relationship between the various stages that make up the overall transaction, e.g., from order creation to routing, execution, settlement and change of ownership when the position is moved between accounts.

At each stage, step, and/or operation, reference data (e.g., an Order ID and/or an associated client identifier) associated with the previous step in the transaction can be maintained with the transaction data and provided to the reporting platform (e.g., a third-party server). The received data can be standardized and/or normalized or otherwise converted into a specified format, stored, and provided to the necessary regulatory agencies on a periodic (e.g., hourly, daily, weekly, quarterly, etc.) and/or ongoing basis. Additionally, the received data can be validated, such as by comparing the data received at one stage (e.g., when the order was placed) with data received at another stage (e.g., when the order was fulfilled). When inconsistencies are detected (e.g., based on such a comparison), relevant market participants can be alerted/prompted, such as in order to correct or validate the inconsistent data, further investigate the discrepancy, etc.

Having received and maintained a database of transaction data that includes information identifying the ultimate beneficiary of each transaction, one or more analyses of the collected data can be performed. In doing so, possible regulatory violations (e.g., insider trading, market manipulation, etc.) can be flagged and linked to the ultimate beneficiary identifiers. For example, separate trades (e.g., for the same stock) that are provided from different banks but which ultimately originate from the same individual/entity can be identified.

Various additional reporting and analytical tools can be incorporated, such as tools that enable the identification of potential regulatory violations with respect to related (though different) ultimate beneficiaries.

FIG. 1 is a schematic diagram depicting various elements and/or aspects described herein. Such elements or components can include one or more personal computers (PC), servers, laptops, tablet computers, and/or any other computing or communication device, and such elements may be connected to one another via a network, which can be a public network (e.g., the Internet), a private network (e.g., a local area network (LAN) or wide area network (WAN)), or a combination thereof.

As shown in FIG. 1, Market Participants 110 correspond to one or more systems, servers, etc., operated by various market participants (e.g., broker-dealers, investment advisors, clearing brokers, self-regulatory organizations (SROs), etc.) can provide trading data (e.g., in any format and from any system) to a transaction monitoring service 120 (it should be understood that, in various implementations, transaction monitoring service can include one or more hardware components and/or devices, one or more software components and/or modules, and/or a combination thereof, such as those described herein). As depicted in FIG. 1, in certain implementations, the received data can be received through an adaptor 121 where it is validated, transformed, and/or transmitted onto an Extract Transform Load ("ETL") tool 122. The ETL tool can conduct further validation and transform the data into the consolidated audit trail ("CAT") format. It should be noted that, in certain implementations, all data received, as well as metadata, can be stored in a database 123. It should be noted that further aspects of the operations of certain components of transaction monitoring service 120 are described in more detail below with respect to FIGS. 2 and 3. It should also be noted that the various components described and/or referenced herein can be combined together or separated in further components, according to a particular implementation.

Moreover, in certain implementations transaction monitoring service 120 can be configured to implement a linking service 124. Such a linking service can be run against the received data and perform data source integration and linking. In doing so, the target data model can daisy chain each transaction from origination to routing, execution and clearing. The linking service can also include quotes and fill reports. In certain implementations, the linkage can be derived using LEI hierarchies and standard product definitions.

In certain implementations, data that has been successfully linked can be normalized and stored separately from data that failed linking. Successfully linked data can then be submitted to a third party system/server 130 (e.g., a regulatory agency), such as in the prescribed format. Data that has failed processing (e.g., data within which inconsistencies are identified, such as from one stage to another within a transaction) can be processed and/or provided to one or more appropriate market participants for their review and/or correction.

Additionally, in various implementations one or more interfaces, online services and/or tools 125 can be provided, such as real-time monitoring services, reporting services and/or exception processing.

Figure 2:
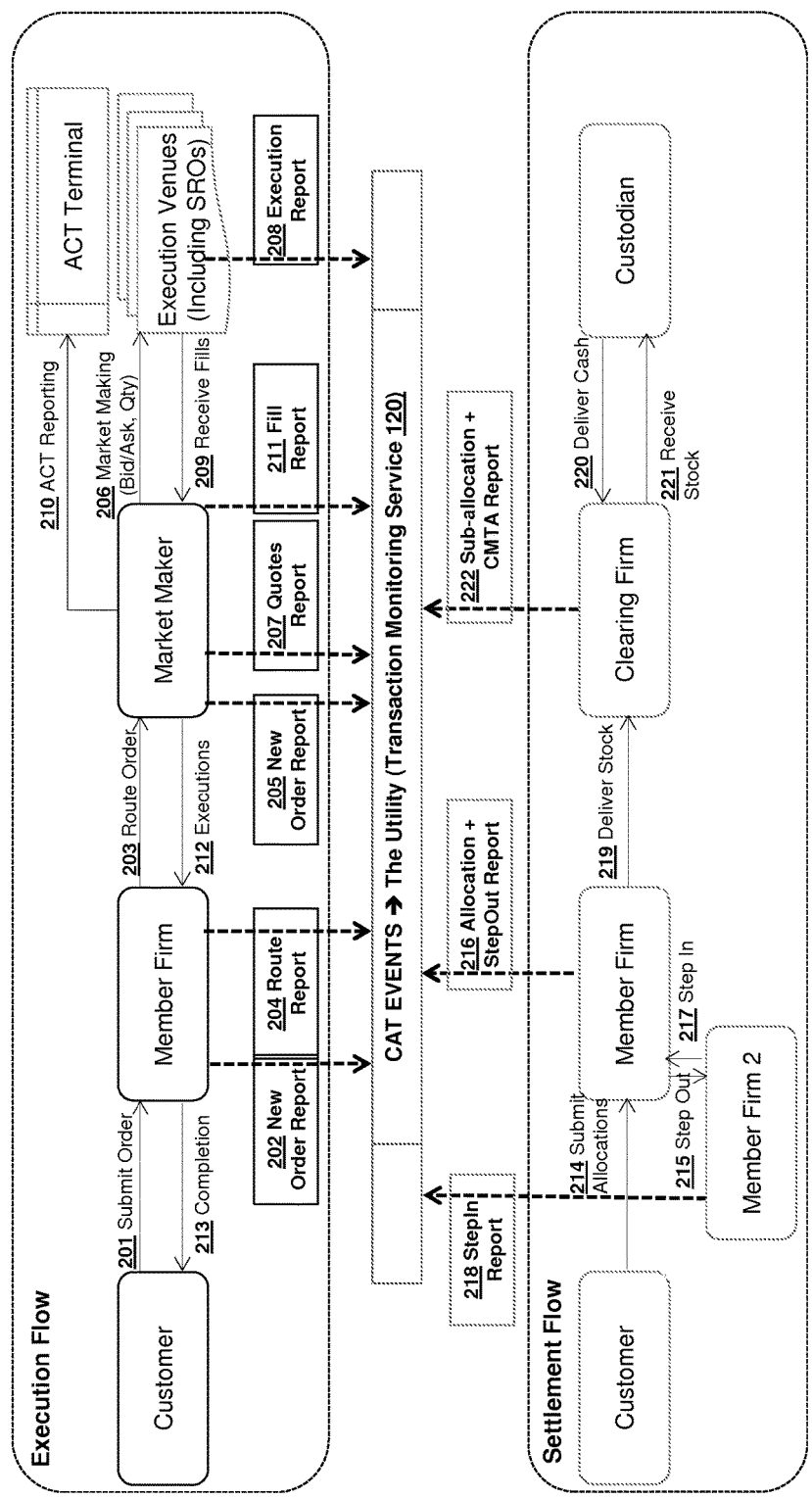
FIG. 2 is a schematic diagram depicting various elements and/or aspects described herein, in accordance with aspects and implementations of the present disclosure.

FIG. 2 is a schematic diagram depicting various additional elements and/or aspects described herein. As shown in FIG. 2, various steps and/or stages can occur during the processing of a particular financial transaction, such as with respect to the execution and/or settlement of such a transaction, as is known to those of ordinary skill in the art (it should be noted that while the various operations described herein are executed by various systems and/or devices, such as is shown and described, in certain implementations certain aspects of such operations may be initiated and/or performed via human interaction and/or communication, such as a client initiating a stock purchase via phone). For example, it can be appreciated that a single financial transaction (e.g., a stock purchase) can entail any number of communications, orders, reports, etc., such as between a customer, member firm, market maker, execution venues, etc. Similarly, multiple communications, reports, etc., are often required in the settlement of such a transaction, such as between a customer, member firm, clearing firm, custodian, etc. Accordingly, the technologies described herein can be implemented such that a central database, server, etc., can be updated with respective reports of each order/transaction from each participant in the transaction. For example and with reference to FIG. 2, upon receiving an order submitted by a customer (201), a member firm can provide a new order report (202) to a central database/server (e.g., transaction monitoring service 120 as depicted in FIG. 1). In addition to the details of the transaction itself (e.g., the stock being purchased, quantity of shares, time stamp, etc.), as described herein, such a report can include one or more additional fields identifying the customer, the ultimate beneficiary of the transaction, and/or one or more related parties or beneficiaries (e.g., subsidiaries, related entities, etc.). The member firm can route such a submitted order to a market maker (203) while providing a corresponding route report (204) (e.g., to transaction monitoring service 120) reflecting the routing of the order. Subsequently, the market maker can also provide a parallel report (205) (e.g., to transaction monitoring service 120), reflecting data for the same transaction as maintained by the market maker, together with a 'daisy chained' audit trail data which can reflect, for example, the identity of the customer/ultimate beneficiary (and/or related parties, etc.), as well as data received from the member firm regarding the transaction (e.g., at 203).

At this juncture it should be noted that audit trail data received at one stage (e.g., 205) can be compared with the audit tail data received at another stage (e.g., 202). In doing so, discrepancies between the respective audit trail records can be identified and routed to the appropriate entity for further action (e.g., correction, etc.), such as is described herein.

The market maker can then route the received order to one or more execution venues (which can include SROs) in one or more market making operations (206), and a quotes report can be provided (e.g., to transaction monitoring service 120) (207). The referenced execution venues can then provide an execution report (e.g., to transaction monitoring service 120) (208) and the received fills can be provided by the execution venues to the market maker (209). The market maker can then report the transaction to an ACT (Automated Confirmation of Transactions) terminal (210), such as in a manner known to those of ordinary skill in the art, and a corresponding fill report can be provided (e.g., to transaction monitoring service 120) (211). The market maker can then provide the referenced executions to the member firm (212), which can, in turn, notify the customer of the completion of the transaction (213).

It should be understood that, as noted above and described in detail herein, at each step/operation throughout the transaction, each participant (e.g., member firm, market maker, execution venue, etc.) can be configured to provide their own data regarding the transaction to a central database/ server such as transaction monitoring service 120, in addition to an audit trail which maintains an ongoing log of data that has been received from earlier participants in the transaction process. In doing so, an audit trail can be created at the first instance in which a transaction is initiated, and such an audit trail can be passed along from participant to participant throughout the various stages of the transaction processing (while also being supplemented with additional information as it is generated throughout the process). As also noted, the data received from a particular participant can be compared to data stored in the referenced audit trail, such as in order to ensure consistency and data integrity throughout the transaction.

As also depicted in FIG. 2, a comparable process can be employed with respect to the settlement flow of a transaction. That is, it can be appreciated that various market participants can interact with one another and/or otherwise participate in the settlement of a particular transaction, such as in a manner known to those of ordinary skill in the art. Accordingly, at each step throughout the settlement process, each participant (e.g., member firm, clearing firm, etc.) can provide updated transaction information to a central database/server (such as transaction monitoring service 120), in addition to an audit trail which maintains an ongoing log of data that has been received from earlier participants in the process. For example, as depicted in FIG. 2, a customer can submit one or more allocations to one member firm (214) which may coordinate such a transaction with another member firm (215, 217), and corresponding reports can be provided by the respective firms (e.g., to transaction monitoring service 120) (216, 218).

The member firm can then deliver the appropriate stock to a clearing firm (219) and a custodian can, in turn, deliver the corresponding cash to the clearing firm (220). The clearing firm can also notify the custodian of the received stock (221) and provide a sub-allocation and Clearing Member Trade Agreement (CMTA) report (such as to transaction monitoring service 120) (222). As noted, at each step/operation throughout the settlement, each participant can be configured to provide their own data regarding the transaction to a central database/server such as transaction monitoring service 120, in addition to an audit trail which maintains an ongoing log of data that has been received from earlier participants in the process.

As noted, a central database/server (such as transaction monitoring service 120) can receive and store updated transaction information received from each market participant, including an audit trail which can reflect information (e.g., ultimate beneficiary information and/or other transaction information) received from previous market participants. The various audit trails received from each market participant and/or other associated information can be compared with one another. In doing so, the degree to which such information is consistent across the various market participants can be determined. Upon identifying inconsistencies (e.g., between the audit trail received from one market participant and that received from another, between the audit trail and other information, e.g., trade information, received from a market participant, etc.), such transactions can be flagged, such as in order to enable various market participants to make appropriate corrections, and/or to enable further investigation of the discrepancy.

Figure 3:
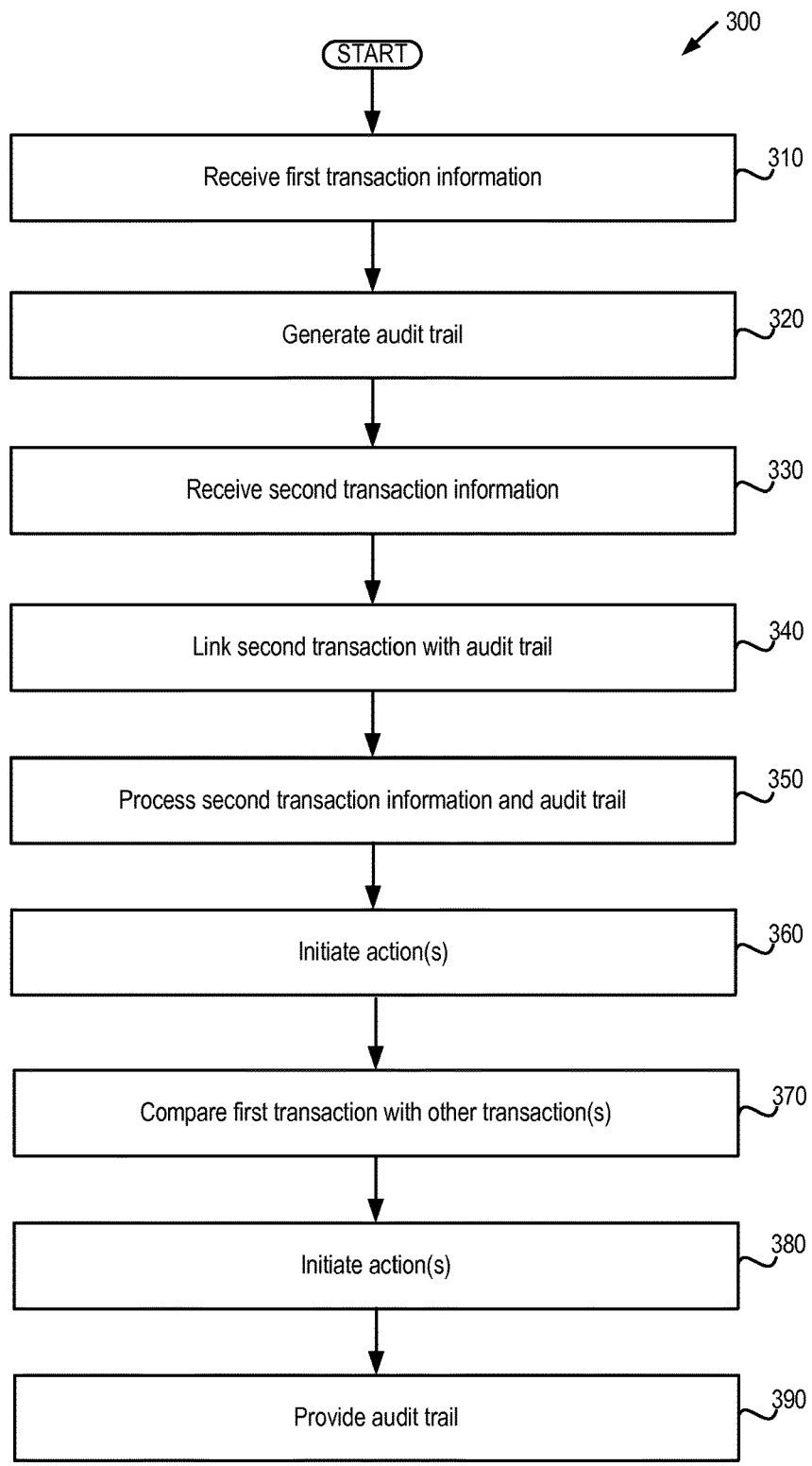
FIG. 3 depicts a flow diagram of aspects of a method for linking data from multiple market participants to generate a consolidated audit trail in accordance with aspects and implementations of the present disclosure.

FIG. 3 depicts a flow diagram of aspects of a method 300 for linking data from multiple market participants to generate a consolidated audit trail. The method is performed by processing logic that may comprise hardware (circuitry, dedicated logic, etc.), software (such as is run on a general purpose computer system or a dedicated machine), or a combination of both. In one implementation, the method is performed by transaction monitoring service 120 of FIG. 1, while in some other implementations, one or more blocks of FIG. 3 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 310, transaction information can be received, such as from a first market participant and/or with respect to a first transaction. Such transaction information can include an identity of a beneficiary of a financial transaction and/or various transaction parameters associated with the financial transaction (e.g., a stock to be purchased, the quantity of shares, the price, a timestamp, etc.). In certain implementations, block 310 can be performed by transaction monitoring service 120, such as is depicted in FIGS. 1 and 2.

At block 320, an audit trail can be generated, such as with respect to the transaction (such as the transaction with respect to which information was received at block 310). Such an audit trail can include the received transaction information. In certain implementations, block 320 can be performed by transaction monitoring service 120, such as is depicted in FIGS. 1 and 2.

At block 330, additional transaction information can be received, such as with respect to the transaction. In certain implementations, such information can be received from another market participant (e.g., a market participant that participates in the transaction at a later stage than the market participant referenced at blocks 310 and/or 320). Such transaction information can include various additional parameters associated with the financial transaction. In certain implementations, block 330 can be performed by transaction monitoring service 120, such as is depicted in FIGS. 1 and 2.

At block 340, the additional/subsequent transaction information (such as that received at block 330) can be linked with the audit trail. Moreover, in certain implementations the second transaction information can be incorporated within the audit trail, such as by 'daisy chaining' the additional subsequent transaction information to the existing/previously generated audit trail. In doing so, the audit trail can continue to grow as the transaction progresses while maintaining a record of the transaction information provided by each participant and/or at each stage/operation of the transaction. Additionally, in certain implementations, block 340 can be performed by transaction monitoring service 120, such as is depicted in FIGS. 1 and 2.

At block 350, the second transaction information and the audit trail can be processed. In doing so, various discrepancies (such as within the audit trail data and/or other associated transaction data) can be identified. For example, upon receiving (e.g., at block 330) transaction information from a market participant during the course of a transaction (reflecting, for example, the identity of the purchaser, the purchase price, quantity, etc.), such parameters can be compared to corresponding parameters provided by previous market participants and stored in the audit trail with respect to the same transaction. In doing so, discrepancies across such transaction information (e.g., information provided by different market participants) can be identified. In certain implementations, block 350 can be performed by transaction monitoring service 120, such as is depicted in FIGS. 1 and 2.

At block 360, various actions (e.g., to initiate corrections of the data, further investigation, etc.) can be initiated, such as based on the identification of such a discrepancy. For example, in certain implementations, upon identifying a discrepancy between transaction provided by one market participant (e.g., with respect to a particular transaction) and corresponding information contained within the audit trail (e.g., that was provided by another market participant), the correction and/or clarification of the second transaction information can be requested, such as from the second market participant. Moreover, in certain implementations, the audit trail can be updated to reflect an identification of the discrepancy. Additionally, block 360 can be performed by transaction monitoring service 120, such as is depicted in FIGS. 1 and 2.

At block 370, the first transaction can be compared with one or more other transactions. In certain implementations, such a comparison can be between the initial transaction and other transactions that are determined to be associated with the same ultimate beneficiary. In doing so, one or more relationships between the first transaction and the one or more other transactions can be identified. That is, it can be appreciated that a single entity (e.g., an investor, bank, etc.) can initiate multiple transactions, each of which are substantively related to one another (e.g., multiple separate trades of the same stock). Accordingly, having associated each transaction with its ultimate beneficiary, multiple transactions (such as those occurring within a defined timeframe) that are associated with the same ultimate beneficiary can be compared with one another. In doing so, a relationship can be identified which can reflect, for example, that multiple transactions initiated by the same beneficiary pertained to the same (or related) stocks, securities, etc. Moreover, In certain implementations, one transaction associated with one beneficiary can be compared with one or more other transactions that are associated with other entities that, although not identical, may be closely related to or associated with the same beneficiary (e.g., subsidiaries, etc.). In doing so, even in scenarios in which two transactions may pertain to two technically separate entities, a relationship between the transactions can be identified (e.g., in a scenario in which both such transactions pertain to a purchase of the same stock within a defined chronological interval). In certain implementations, block 370 can be performed by transaction monitoring service 120, such as is depicted in FIGS. 1 and 2.

At block 380, one or more actions can be initiated. In certain implementations, such actions can be initiated based on the relationship identified at block 370. For example, upon identifying various relationships between multiple transactions (e.g., within a defined chronological interval) initiated by the same or related ultimate beneficiaries, such transactions can be flagged (e.g., for further review prior to completing the transaction), one or more regulatory entities can be notified, etc. Moreover, in certain implementations, block 380 can be performed by transaction monitoring service 120, such as is depicted in FIGS. 1 and 2.

At block 390, the audit trail can be provided to a third market participant. That is, having created and maintained an audit trail with respect to a transaction as the transaction has progressed between multiple market participants, such an audit trail can be provided/transmitted to another market participant (e.g., in furtherance of the completion of the transaction) and/or for storage, archival, and/or regulatory compliance purposes. In certain implementations, block 390 can be performed by transaction monitoring service 120, such as is depicted in FIGS. 1 and 2.

It should be noted that a substantially comparably process as performed with respect to the first/second transaction information, the first/second market participants, etc., can be performed any number of additional times, such as with respect to any number of additional participants. In doing so, each respective participant can transfer one or more details of the transaction, such as the details of its Order ID as well as the associated Client ID to one or more other participants. A subsequent participant can then send its own (Order ID+associated Client ID) to yet another participant. In this manner the various orders can be linked.

It should be noted that while the technologies described herein are illustrated primarily with respect to creating and maintaining an audit trail in order to track various transaction parameters across multiple market participants throughout the processing of a financial transaction, the described technologies can also be implemented towards any number of additional objectives. For example, the technologies described herein can be implemented for surveillance purposes (e.g., with respect to various market participants, types of transactions, etc.), such as in a Cross IB platform (e.g., SONAR), Nasdaq offering on trade surveillance (SMARTS), etc. Additionally, the disclosed technologies can be implemented to enable and/or improve regulatory manager workflow, such as with respect to approval of audit reports by registered managers, such as with respect to performing WSPs (Written Service Procedures).

In certain implementations, the technologies described herein can be implemented as a replacement and/or supplement for third party data aggregators and vendors (e.g. MSI, Tag, Bloomberg and OMS vendors), such as with respect to best execution analytics. Moreover, in certain implementations the technologies can be employed to provide an external/centralized view of internal order flow, thereby serving as a replacement and/or supplement for products such as Equity Trade Journal (ETJ) from Nasdaq TRF and Merged Order Log (MOL) from NYSE.

Due to standardized definitions of LEI and products provided herein, foreign client and foreign security reports can be easily identified. Additionally, the 'daisy chaining' techniques described herein can be utilized to identify trade breaks and/or COD/DVP fails between Market Participants. Moreover, various data issues can be identified and corrected (e.g., overnight and/or off-shore) ahead of FINRA rejects, and the data correction can be provided back into Market Participant platform.

Figure 4:
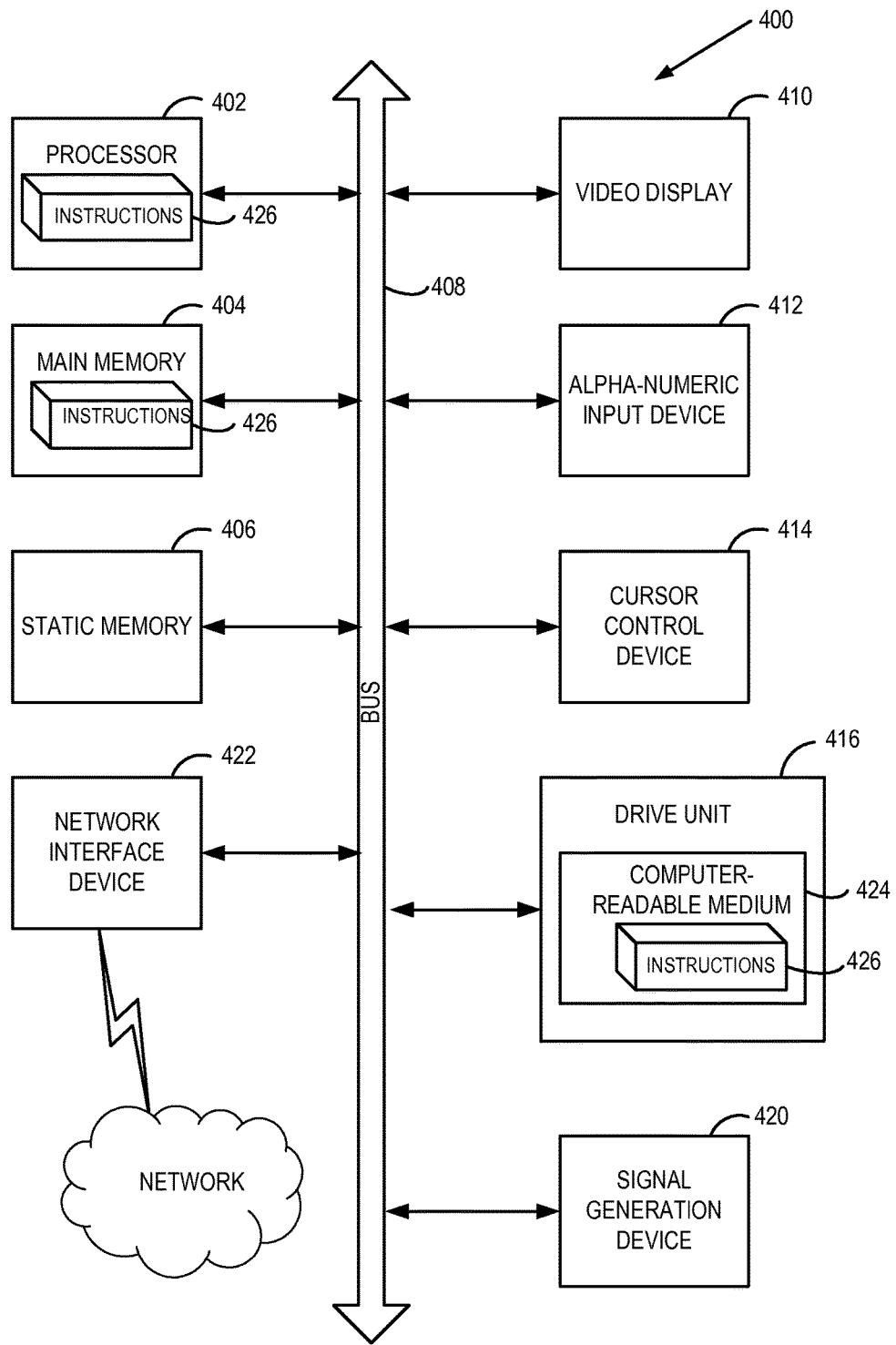
FIG. 4 depicts a block diagram of an illustrative computer system operating in accordance with aspects and implementations of the present disclosure.

FIG. 4 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions executed by collaboration manager 225, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "linking," "processing," "initiating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, those described and/or referenced herein. The scope of the disclosure should, therefore, be determined with reference to the appended claims, along with the full scope of equivalents to which such claims are entitled.

What is claimed is:

1. A computer-implemented method for linking data to generate a consolidated audit trail using a transaction monitoring system, the method comprising:
   receiving, over the Internet, at an adaptor of the transaction monitoring system, from a first market participant and with respect to a first transaction, first transaction information, the first transaction information comprising an identity of a beneficiary of the first transaction and one or more first transaction parameters associated with the first transaction;
   transmitting the first transaction information from the adaptor to an Extract Transform Load (ETL) tool;
   transforming the first transaction information into a consolidated audit trail format with the ETL tool and generating an audit trail with respect to the first transaction, the audit trail comprising one or more first data fields for the one or more first transaction parameters and one or more additional data fields for the data identifying the beneficiary;
   receiving, over the Internet, at the adaptor of the transaction monitoring system, from a second market participant and with respect to the first transaction, second transaction information, the second transaction information comprising the identity of the beneficiary and one or more second transaction parameters associated with the first transaction;
   linking the second transaction information comprising data for one or more second transaction parameters with one or more second data fields in the audit trail when the identity of the beneficiary in the second transaction information is the same as the identity of the beneficiary in the one or more additional data fields in the audit trail;
   processing, with one or more processors, the first transaction information and the second transaction information to identify a discrepancy, wherein a portion of the second transaction information failed to successfully link to the first transaction information;
   normalizing and storing successfully linked second transaction information in a database of the transaction monitoring system;
   initiating one or more first actions with respect to the second transaction information failing to link based on the discrepancy and updating the audit trail to reflect identification of the discrepancy; and
   providing an updated audit trail, thereby enabling monitoring of the first transaction throughout the transaction process.

2. The method of claim 1, further comprising:
   comparing the first transaction with one or more transactions associated with the beneficiary to identify a relationship between the first transaction and the one or more transactions; and initiating one or more second actions based on the relationship.

3. The method of claim 2, wherein comparing the first transaction with one or more transactions associated with the beneficiary comprises comparing the first transaction with one or more transactions associated with an entity related to the beneficiary to identify a relationship between the first transaction and the one or more transactions.

4. The method of claim 1, wherein initiating one or more first actions comprises requesting correction of the second transaction information from the second market participant.

5. The method of claim 1, wherein initiating one or more first actions comprises updating the audit trail to reflect an identification of the discrepancy.

6. The method of claim 1, wherein linking the second transaction information with the audit trail comprises incorporating the second transaction information within the audit trail.

7. The method of claim 1, further comprising providing the audit trail to a third market participant.

8. A transaction monitoring system for linking data to generate a consolidated audit trail, the method enabling efficient monitoring of a transaction throughout the transaction process, the system comprising:
   a memory; and
   a processing device, coupled to the memory, to:
      receive, over the Internet, from a first market participant and with respect to a first transaction, first transaction information at an adaptor of the transaction monitoring system, the first transaction information comprising an identity of a beneficiary of the first transaction and one or more first transaction parameters associated with the first transaction;
      transmit the first transaction information from the adaptor to an Extract Transform Load (ETL) tool;
      transform the first transaction information into a consolidated audit trail format with the ETL tool and generate an audit trail with respect to the first transaction, the audit trail comprising one or more first data fields for the one or more first transaction parameters and one or more additional data fields for the data identifying the beneficiary;
      receive, over the Internet from a second market participant and with respect to the first transaction, second transaction information at the adaptor of the transaction monitoring system, the second transaction information comprising the identity of the beneficiary and one or more second transaction parameters associated with the first transaction;
      link the second transaction information comprising data for one or more second transaction parameters with one or more second data fields in the audit trail when the identity of the beneficiary in the second transaction information is the same as the identity of the beneficiary in the one or more additional data fields in the audit trail;
      process the first transaction information and the second transaction information to identify a discrepancy, wherein a portion of the second transaction information failed to successfully link to the first transaction information;
      normalize and store successfully linked second transaction information in a database of the transaction monitoring system; and
      initiate one or more first actions with respect to the second transaction information failing to link based on the discrepancy and updating the audit trail to reflect identification of the discrepancy; and
      provide an updated audit trail, thereby enabling monitoring of the first transaction throughout the transaction process.

9. The system of claim 8, wherein the processing device is further to:

compare the first transaction with one or more transactions associated with the beneficiary to identify a relationship between the first transaction and the one or more transactions; and initiate one or more second actions based on the relationship.

10. The system of claim 9, wherein to compare the first transaction with one or more transactions associated with the beneficiary is to compare the first transaction with one or more transactions associated with an entity related to the beneficiary to identify a relationship between the first transaction and the one or more transactions.

11. The system of claim 8, wherein to initiate one or more first actions is to request correction of the second transaction information from the second market participant.

12. The system of claim 8, wherein to initiate one or more first actions is to update the audit trail to reflect an identification of the discrepancy.

13. The system of claim 8, wherein to link the second transaction information with the audit trail is to incorporate the second transaction information within the audit trail.

14. The system of claim 8, wherein the processing device is further to providing the audit trail to a third market participant.

15. A non-transitory computer readable medium having instructions stored thereon that, when executed by a processor, cause the processor to link data to generate a consolidated audit trail by performing operations comprising:

receiving, over the Internet, at an adaptor of a transaction monitoring system, from a first market participant and with respect to a first transaction, first transaction information, the first transaction information comprising an identity of a beneficiary of the first transaction and one or more first transaction parameters associated with the first transaction;

transmitting the first transaction information from the adaptor to an Extract Transform Load (ETL) tool;

transforming the first transaction information into a consolidated audit trail format with the ETL tool and generating an audit trail with respect to the first transaction, the audit trail comprising one or more first data fields for the one or more first transaction parameters and one or more additional data fields for the data identifying the beneficiary;

receiving, from a second market participant over the Internet, at the adaptor of the transaction monitoring system, and with respect to the first transaction, second transaction information, the second transaction information comprising the identity of the beneficiary and one or more second transaction parameters associated with the first transaction;

linking the second transaction information comprising data for one or more second transaction parameters with one or more second data fields in the audit trail when the identity of the beneficiary in the second transaction information is the same as the identity of the beneficiary in the one or more additional data fields in the audit trail;

processing, with one or more processors, the first transaction information and the second transaction information to identify a discrepancy, wherein a portion of the second transaction information failed to successfully link to the first transaction information;

normalizing and storing successfully linked second transaction information in a database of the transaction monitoring system; and initiating one or more first actions with respect to the second transaction information failing to link based on the discrepancy and updating the audit trail to reflect identification of the discrepancy; and providing an updated audit trail, thereby enabling monitoring of the first transaction throughout the transaction process.

16. The non-transitory computer readable medium of claim 15, further comprising:

comparing the first transaction with one or more transactions associated with the beneficiary to identify a relationship between the first transaction and the one or more transactions; and initiating one or more second actions based on the relationship.

17. The non-transitory computer readable medium of claim 16, wherein comparing the first transaction with one or more transactions associated with the beneficiary comprises comparing the first transaction with one or more transactions associated with an entity related to the beneficiary to identify a relationship between the first transaction and the one or more transactions.

18. The non-transitory computer readable medium of claim 15, wherein initiating one or more first actions comprises requesting correction of the second transaction information from the second market participant.

19. The non-transitory computer readable medium of claim 15, wherein initiating one or more first actions comprises updating the audit trail to reflect an identification of the discrepancy.

* * * * *